(12) United States Patent
Chen et al.

(10) Patent No.: US 8,475,579 B2
(45) Date of Patent: Jul. 2, 2013

(54) BLACK INK COMPOSITION

(75) Inventors: Chien-Ming Chen, Taoyuan (TW);
Shun-Te Lin, Taoyuan (TW);
Chien-Wen Lee, Taoyuan (TW);
Wen-Chin Lin, Taoyuan (TW)

(73) Assignee: Everlight USA, Inc, Pineville, NC (US)

( * ) Notice: Subject to any disclaimer, the term of this patent is extended or adjusted under 35 U.S.C. 154(b) by 358 days.

(21) Appl. No.: 12/825,583

(22) Filed: Jun. 29, 2010

(65) Prior Publication Data

US 2011/0297040 A1 Dec. 8, 2011

(30) Foreign Application Priority Data

Jun. 2, 2010 (TW) ................. 99117722 A

(51) Int. Cl.
*C09D 11/02* (2006.01)
(52) U.S. Cl.
USPC .................... 106/31.58; 106/31.86
(58) Field of Classification Search
USPC .............. 106/31.58, 31.43, 31.86, 31.75
See application file for complete search history.

(56) References Cited

U.S. PATENT DOCUMENTS

| | | | | | |
|---|---|---|---|---|---|
| 5,690,721 | A | * | 11/1997 | Itoh | 106/31.13 |
| 5,803,959 | A | * | 9/1998 | Johnson et al. | 106/31.75 |
| 5,976,233 | A | * | 11/1999 | Osumi et al. | 106/31.86 |
| 6,004,389 | A | | 12/1999 | Yatake | |
| 6,221,143 | B1 | * | 4/2001 | Palumbo | 106/31.6 |
| 6,277,183 | B1 | * | 8/2001 | Johnson et al. | 106/31.75 |
| 6,494,946 | B1 | * | 12/2002 | Belmont et al. | 106/472 |
| 6,695,443 | B2 | | 2/2004 | Arita et al. | |
| 6,737,449 | B1 | | 5/2004 | Yatake | |
| 6,899,754 | B2 | * | 5/2005 | Yeh et al. | 106/31.86 |
| 7,296,883 | B2 | * | 11/2007 | Kanaya et al. | 106/31.6 |
| 7,479,179 | B2 | * | 1/2009 | Szajewski | 106/31.86 |

* cited by examiner

*Primary Examiner* — Helene Klemanski
(74) *Attorney, Agent, or Firm* — Turocy & Watson, LLP

(57) ABSTRACT

A black ink composition is provided. The black ink composition includes a dispersive black colorant; less than 1 wt % of a glycol ether compound based on total weight of the black ink composition; a solvent; and water. The black ink composition of the present invention is free of surfactants and has excellent compatibility with a nozzle, and thus provides good smoothness in printing and high-quality image.

7 Claims, 3 Drawing Sheets

| printing paper | HP #27 ink | Example 19 | Comparative Example 1 | Comparative Example 2 |
|---|---|---|---|---|
| Paper On paper | | | | |
| Double A paper | | | | |
| HP Office paper | | | | |

| printing paper | HP #27 ink | Example 19 | Comparative Example 1 | Comparative Example 2 |
|---|---|---|---|---|
| Paper On paper |  |  |  |  |
| Double A paper |  |  |  |  |
| HP Office paper |  |  |  |  |

| printing paper | HP #27 ink | Example 19 | Comparative Example 1 | Comparative Example 2 |
|---|---|---|---|---|
| Paper On paper | | | | |
| Double A paper | | | | |
| HP Office paper | | | | |

FIG. 1B

| printing paper | HP #27 ink | Example 19 | Comparative Example 1 | Comparative Example 2 |
|---|---|---|---|---|
| Paper On paper | | | | |
| Double A paper | | | | |
| HP Office paper | | | | |

FIG. 1C

BLACK INK COMPOSITION

FIELD OF INVENTION

The present invention relates to a black ink composition, and more particularly, to a black ink composition without a surfactant.

BACKGROUND OF THE INVENTION

Inkjet printing technology is non-impact printing, provides sharp and non-feathering images, and has great property such as water-fastness, light-fastness, optical density, storage stability and non-clogging, etc.

Generally, surface tension and viscosity of ink significantly influence stability of inkjet speed, interval of two ink drops, drop size and drop flow velocity. As to color inkjet system, surface tension of ink is controlled by a surfactant. For example, U.S. Pat. No. 6,695,443 discloses an ink composition including an anionic surfactant or non-ionic surfactant. U.S. Pat. No. 6,737,449 discloses a composition including an acetylene glycol surfactant. However, the surfactants in the previous compositions are not easily degraded and cause environmental pollutions. U.S. Pat. No. 6,004,389 discloses an ink composition including a polyoxyethyl glycerin ether compound, such as diethylene glycol mono-n-butyl ether, triethylene glycol mono-n-butyl ether, propylene glycol mono-n-butyl ether or dipropylene glycol mono-n-butyl ether. However, such composition has more than 3 wt % of the polyoxyethyl glycerin ether compound, which is used with a surfactant. It is found that due to the addition of the polyoxyethyl glycerin ether compound, the ink easily penetrates into a printing paper, such that ink drops blur the printing paper and adversely affect printing quality.

Accordingly, there is an urgent need to overcome the above drawbacks in the art.

SUMMARY OF THE INVENTION

The present invention provides a black ink composition including a dispersive black colorant; less than 1 wt % of a glycol ether compound based on total weight of the black ink composition; a solvent; and water.

The dispersive black colorant of the present invention is carbon black (color index pigment black 7, PBk7), which is treated to have at least a functional group being carbonyl, carboxyl, hydroxyl, sulfonyl or its salt.

In comparison with the conventional ink compositions, the black ink composition of the present invention is free of a surfactant, and thus has no damage to organisms and environment.

The glycol ether compound in the black ink composition of the present invention is one or more selected from the group consisting of ethylene glycol mono-butyl ether, diethylene glycol mono-butyl ether, triethylene glycol mono-butyl ether, triethylene glycol mono-methyl ether, diethylene glycol mono-methyl ether and dipropylene glycol methyl ether. The black ink composition includes 0.1 to 1 wt % of the glycol ether compound based on total weight of the black ink composition, and has surface tension ranging from 47 to 54 mN/m.

In comparison with the conventional ink compositions, the black ink composition of the present invention has significantly higher surface tension, so as to eliminate over penetration and improve printing effect and image quality. In addition to improve surface tension of the ink composition, the glycol ether in the black ink composition of the present invention wets the nozzle which makes ink more compatible with the nozzle, facilitate ink dry, and keeps ink stability.

BRIEF DESCRIPTION OF THE DRAWINGS

FIG. 1B is a printing image showing the result of the resolution test of the black ink composition of the present application, HP #27 ink and Comparative Examples 1 and 2 by printing a letter M with the character size "2" on Paper On, Double A and HP Office papers.

FIG. 1C is a printing image showing the result of the resolution test of the black ink composition of the present application, HP #27 ink and Comparative Examples 1 and 2 by printing a letter R with the character size "2" on Paper On, Double A and HP Office papers.

DETAILED DESCRIPTION OF THE PREFERRED EMBODIMENTS

Figure 1A:
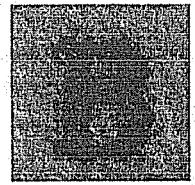
FIG. 1A is a printing image showing the result of the resolution test of the black ink composition of the present application, HP #27 ink and Comparative Examples 1 and 2 by printing a letter B with the character size "2" on Paper On, Double A and HP Office papers.
Figure 1A:
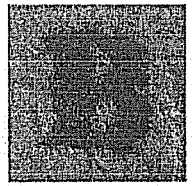
Figure 1A:
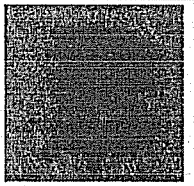
Figure 1A:
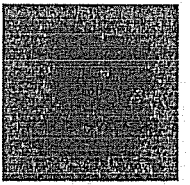
Figure 1A:
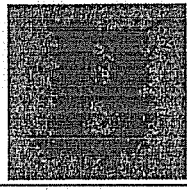
Figure 1A:
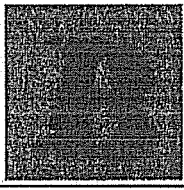
Figure 1A:
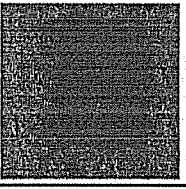
Figure 1A:
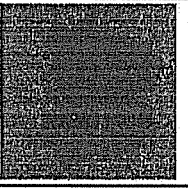
Figure 1A:
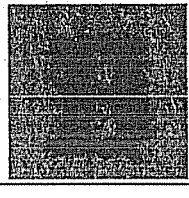
Figure 1A:
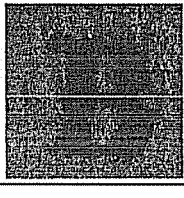
Figure 1A:
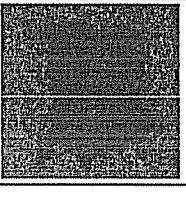
Figure 1A:
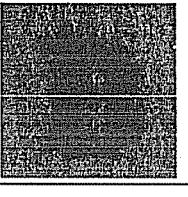

The following specific examples are used for illustrating the present invention. A person skilled in the art can easily conceive the other advantages and effects of the present invention.

The present invention provides a black ink composition including a dispersive black colorant; less than 1 wt % if a glycol ether compound based on total weight of the black ink composition; a solvent; and water.

In the black ink composition, the black colorant may be any commercial carbon black purchased from Columbian Chemicals Company, Mitsubishi, or Evonik Degussa. The carbon black is treated to have at least a functional group being carbonyl, carboxyl, hydroxyl, sulfonyl or its salt. Generally, the black ink composition includes 1 to 10 wt %, preferably 3 to 6 wt % of the black colorant based on total weight of the black ink composition.

The black ink composition further includes a penetrating agent, a moisturizing agent or a combination thereof. The penetrating agent can be, but not limited to, at least one of N-methylpyrrolidone and 1,3-butylene glycol. The moisturizing agent can be, but not limited to, at least one of glycerine and diethylene glycol.

The black ink composition includes 2 to 20 wt %, preferably 5 to 20 wt %, and more preferably 5 to 15 wt %, of the penetrating agent based on total weight of the black ink composition. For example, the black ink composition includes 5 to 15 wt % of N-methylpyrrolidone. Alternatively, the black ink composition may include 2 to 10 wt %, preferably 2 to 8 wt %, of 1,3-butylene glycol.

The black ink composition includes 2 to 20 wt % of a moisturizing agent based on total weight of the black ink composition. For example, the black ink composition includes 2 to 8 wt % of glycerine. Alternatively, the black ink composition includes 5 to 20 wt %, preferably 10 to 18 wt %, of diethylene glycol.

In order to achieve the purpose of the present invention, the black ink composition includes less than 1 wt % of a glycol ether compound being one or more selected from the group consisting of ethylene glycol mono-butyl ether, diethylene glycol mono-butyl ether, triethylene glycol mono-butyl ether, triethylene glycol mono-methyl ether, diethylene glycol mono-methyl ether and dipropylene glycol methyl ether. Preferably, the glycol ether compound is ethylene glycol mono-butyl ether. The black ink composition of the present invention includes about at least 0.1 wt % of a glycol ether compound, and surface tension of the black ink composition ranges from 47 to 54 mN/m.

In addition to the above components, the remaining portion of the black ink composition may be water. Generally, the water may be pure water, deionized water or distilled water.

The black ink composition may optionally further include an additive such as an antimicrobial agent. For example, the antimicrobial agent can be NUOSEPT (NudeX, Inc., a division of Huls America), UCARCIDE (Union Carbide), VANCIDE (RTVanderbilt Co.) or PROXEL XL2 (ICI Americas Inc.).

There is no specific limited concentration of the additive in the black ink composition. In one embodiment, the black ink composition includes 0.1 to 0.5 wt % of an antimicrobial agent.

The features and effects of the present invention are illustrated, but not limited, by the following embodiments.

Preparation of a Black Ink Composition

The components of the black ink composition are listed in Table 1 and Table 2. The components were stirred and mixed at room temperature to form Examples 1-28 of the black ink compositions. The unit of each component in the black ink composition is wt %.

TABLE 1

Components of the black ink compositions

| Example | GLY | NMP | DEG | EGMBE | Proxel GXL | J1008503 | water |
|---|---|---|---|---|---|---|---|
| 1 | 8 | 5 | 14 | 0.2 | 0.2 | 19.78 | added to meet total weight of 100 g |
| 2 | 4 | 5 | 18 | 0.2 | 0.2 | 19.78 | added to meet total weight of 100 g |
| 3 | 4 | 5 | 14 | 0.2 | 0.2 | 19.78 | added to meet total weight of 100 g |
| 4 | 2 | 5 | 14 | 0.2 | 0.2 | 19.78 | added to meet total weight of 100 g |
| 5 | 8 | 5 | 10 | 0.2 | 0.2 | 19.78 | added to meet total weight of 100 g |
| 6 | 4 | 5 | 10 | 0.2 | 0.2 | 19.78 | added to meet total weight of 100 g |
| 7 | 2 | 5 | 10 | 0.2 | 0.2 | 19.78 | added to meet total weight of 100 g |
| 8 | 8 | 15 | 14 | 0.2 | 0.2 | 19.78 | added to meet total weight of 100 g |
| 9 | 4 | 15 | 18 | 0.2 | 0.2 | 19.78 | added to meet total weight of 100 g |
| 10 | 4 | 15 | 14 | 0.2 | 0.2 | 19.78 | added to meet total weight of 100 g |
| 11 | 2 | 15 | 14 | 0.2 | 0.2 | 19.78 | added to meet total weight of 100 g |
| 12 | 8 | 15 | 10 | 0.2 | 0.2 | 19.78 | added to meet total weight of 100 g |
| 13 | 4 | 15 | 10 | 0.2 | 0.2 | 19.78 | added to meet total weight of 100 g |
| 14 | 2 | 15 | 10 | 0.2 | 0.2 | 19.78 | added to meet total weight of 100 g |

TABLE 2

Components of the black ink compositions

| Example | 1,3-BG | NMP | DEG | EGMBE | Proxel GXL | J1008503 | water |
|---|---|---|---|---|---|---|---|
| 15 | 8 | 5 | 14 | 0.2 | 0.2 | 19.78 | added to meet total weight of 100 g |
| 16 | 4 | 5 | 18 | 0.2 | 0.2 | 19.78 | added to meet total weight of 100 g |
| 17 | 4 | 5 | 14 | 0.2 | 0.2 | 19.78 | added to meet total weight of 100 g |
| 18 | 2 | 5 | 14 | 0.2 | 0.2 | 19.78 | added to meet total weight of 100 g |
| 19 | 8 | 5 | 10 | 0.2 | 0.2 | 19.78 | added to meet total weight of 100 g |
| 20 | 4 | 5 | 10 | 0.2 | 0.2 | 19.78 | added to meet total weight of 100 g |
| 21 | 2 | 5 | 10 | 0.2 | 0.2 | 19.78 | added to meet total weight of 100 g |

TABLE 2-continued

Components of the black ink compositions

| Example | 1,3-BG | NMP | DEG | EGMBE | Proxel GXL | J1008503 | water |
|---|---|---|---|---|---|---|---|
| 22 | 8 | 15 | 14 | 0.2 | 0.2 | 19.78 | added to meet total weight of 100 g |
| 23 | 4 | 15 | 18 | 0.2 | 0.2 | 19.78 | added to meet total weight of 100 g |
| 24 | 4 | 15 | 14 | 0.2 | 0.2 | 19.78 | added to meet total weight of 100 g |
| 25 | 2 | 15 | 14 | 0.2 | 0.2 | 19.78 | added to meet total weight of 100 g |
| 26 | 8 | 15 | 10 | 0.2 | 0.2 | 19.78 | added to meet total weight of 100 g |
| 27 | 4 | 15 | 10 | 0.2 | 0.2 | 19.78 | added to meet total weight of 100 g |
| 28 | 2 | 15 | 10 | 0.2 | 0.2 | 19.78 | added to meet total weight of 100 g |

GLY: glycerine
1,3-BG: 1,3-butylene glycol
NMP: N-methylpyrrolidone
DEG: diethylene glycol
EGMBE: ethylene glycol mono-butyl ether
Proxel GXL: antimicrobial agent (ICI Americas Inc.)
J1008503: carbon black (BK-A15; Everlight Chemical Industrial Corp.)

Cloud Point Test

The carbon black in the above Examples was replaced with water to facilitate observation. The ink compositions disclosed in U.S. Pat. No. 6,004,389 were taken as comparative samples in this cloud point test. Table 3 shows the components of the comparative samples with or without a surfactant.

In cloud point test, 50 g of the sample was heated from room temperature to 105° C., and the temperature at which turbidity occurred in the sample solution was recorded.

TABLE 3

Components of the ink compositions disclosed in U.S. Pat. No. 6,004,389

|  | Comparative Example 1 | Comparative Example 2 |
|---|---|---|
| DEGMBE | 10.00 | 10.00 |
| 1,6-hexanediol | 5.00 | 5.00 |
| tripropylene glycol | 2.00 | 2.00 |
| DMI | 2.00 | 2.00 |
| Surfynol 104 | 0.80 | 0.00 |
| Surfynol 465 | 0.40 | 0.00 |
| Water | 79.80 | 81.00 |

In could point test, the temperatures at which turbidity occurred in the black ink composition of the present invention and in the comparative sample without a surfactant were both more than 100° C.; however, the temperature at which turbidity occurred in the comparative sample with surfactants was about 21° C. Accordingly, the black ink composition of the present invention has great stability, such that the components of the ink composition would have good images free from feathering or bleeding.

Penetration Test

The black ink composition of the present invention and the comparative samples of Table 3 were respectively dropped on glass substrates with or without a wax film, and the contact angle between the drop and the substrate was measured by a contact angle meter. The results were shown in Tables 4 and 5.

TABLE 4

Results of the test on the glass substrate with a wax film

|  | Contact angle | Diameter of bottom surface | Surface tension |
|---|---|---|---|
| Comparative Example 1 | 27.88 | 8.22 | 27.5 |
| Comparative Example 2 | 51.17 | 6.93 | 36.7 |
| Example 19 | 78.54 | 6.40 | 52 |

TABLE 5

Results of the test on the glass substrate without a wax film

|  | Contact angle | Diameter of bottom surface | Surface tension |
|---|---|---|---|
| Comparative Example 1 | 9.11 | 11.76 | 27.5 |
| Comparative Example 2 | 17.03 | 10.56 | 36.7 |
| Example 19 | 43.34 | 8.58 | 52 |

As shown in Tables 4 and 5, the black ink composition formed significantly larger contact angles than Comparative Examples. In other words, the black ink composition of the present invention has smaller contact area on the substrate, so as to avoid blurring on the substrate. Hence, in comparison with the ink composition disclosed in U.S. Pat. No. 6,004,389, the black ink composition of the present invention has significantly higher surface tension, and thus eliminates being penetrating into a substrate to blur images. In addition, in the drop size test, the black ink composition of the present invention formed larger drops due to higher internal cohesion force. In contrast, the conventional ink compositions were easily influenced by external force, so as to form satellite drops.

Resolution Test

The black ink composition of the present invention, HP #27 ink and Comparative Examples 1 and 2 were tested to print letters B, M and R with the character size "2" on Paper On, Double A and HP Office papers for subsequent tests.

The printing images were observed and photographed via a microscope, and the results were shown in FIG. 1A to 1C.

Line Segment Resolution Test

The black ink composition of the present invention, HP #27 ink and Comparative Examples 1 and 2 were tested to print on Paper On, Double A and HP Office papers for subsequent tests.

The size of the line width was 0.01 pt, and the printing images were detected by a lime width meter (PERSONAL IAS, Quality Engineering Associates, Inc.) for triple detections. The average value of the three detections was shown in Table 6, wherein the printing images with the best resolution to the worse resolution were indicated as ☐, ☐, ○ and ☐, respectively.

TABLE 6

Results of the resolution tests

| | Resolution of letters | Resolution of line segment |
|---|---|---|
| HP #27 ink | ☐ | ☐ |
| Comparative Example 1 | ☐ | ☐ |
| Comparative Example 2 | ○ | ○ |
| Example 19 | ☐ | ☐ |

It is shown in FIG. 1A to FIG. 1C and Table 6 that in comparison with HP #27 ink and the ink compositions disclosed in U.S. Pat. No. 6,004,389, the black ink composition of the present invention formed significantly fewer satellite drops and blurring edges, and thus caused significantly greater resolution. Therefore, the black ink composition of the present invention having higher surface tension forms smaller contact area on a substrate, and thus hardly penetrates into a printing paper and provides high resolution. As to the line width resolution, the black ink composition of the present invention provides the thinner line width and better resolution than the conventional ink compositions. Accordingly, the black ink composition of the present invention provides great printing quality.

In summary, the black ink composition of the present invention has higher surface tension, hardly penetrates into and blurs on a substrate, so as to print the thinner line width on a printing paper with great resolution and quality.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

What is claimed is:

1. A black ink composition, comprising:
    a dispersive black colorant;
    0.1 to 1 wt % of a glycol ether compound based on total weight of the black ink composition;
    a solvent; and
    water, wherein the black ink composition has no surfactant.

2. The black ink composition of claim 1, wherein the dispersive black colorant is carbon black.

3. The black ink composition of claim 1, wherein the glycol ether compound is one selected from the group consisting of ethylene glycol mono-butyl ether, diethylene glycol mono-butyl ether, triethylene glycol mono-butyl ether, triethylene glycol mono-methyl ether, diethylene glycol mono-methyl ether and dipropylene glycol methyl ether.

4. The black ink composition of claim 1, further comprising a penetrating agent, a moisturizing agent or a combination thereof.

5. The black ink composition of claim 4, wherein the penetrating agent is at least one of N-methylpyrrolidone and 1,3-butylene glycol.

6. The black ink composition of claim 4, wherein the moisturizing agent is at least one of glycerine and diethylene glycol.

7. The black ink composition of claim 1, having a surface tension of 47 to 54 mN/m at room temperature.

* * * * *